(12) United States Patent
Evans

(10) Patent No.: US 8,741,214 B2
(45) Date of Patent: Jun. 3, 2014

(54) SINTERING METHOD, PARTICULARLY FOR FORMING LOW ESR CAPACITOR ANODES

(75) Inventor: David A. Evans, Seekonk, MA (US)

(73) Assignee: Evans Capacitor Company, East Providence, RI (US)

(*) Notice: Subject to any disclaimer, the term of this patent is extended or adjusted under 35 U.S.C. 154(b) by 374 days.

(21) Appl. No.: 13/274,393

(22) Filed: Oct. 17, 2011

(65) Prior Publication Data

US 2013/0095299 A1    Apr. 18, 2013

(51) Int. Cl.
*B22F 3/12*         (2006.01)
*B22F 5/10*         (2006.01)
*B22F 7/04*         (2006.01)
*H01G 9/052*        (2006.01)

(52) U.S. Cl.
USPC ...... 419/8; 419/26; 419/29; 419/38; 361/307; 361/509; 361/510; 361/528; 361/529; 361/533

(58) Field of Classification Search
CPC .................................................. H01G 9/0525
USPC .............................................................. 419/8
See application file for complete search history.

(56) References Cited

U.S. PATENT DOCUMENTS

| | | | |
|---|---|---|---|
| 5,369,547 A | 11/1994 | Evans | |
| 5,986,877 A | 11/1999 | Pathare et al. | |
| 6,045,935 A | 4/2000 | Ketcham et al. | |
| 6,965,510 B1 | 11/2005 | Liu et al. | |
| 7,837,743 B2 | 11/2010 | Gaffney et al. | |
| 7,929,275 B2 * | 4/2011 | Kuriyama | 361/532 |
| 2004/0113242 A1 | 6/2004 | Kato et al. | |
| 2006/0163774 A1 | 7/2006 | Abels et al. | |
| 2006/0234023 A1 | 10/2006 | Endou et al. | |
| 2007/0172377 A1 | 7/2007 | Fife et al. | |
| 2009/0169841 A1 | 7/2009 | Abels et al. | |
| 2010/0110615 A1 * | 5/2010 | Nishimura et al. | 361/528 |
| 2010/0214723 A1 | 8/2010 | Karnik | |
| 2010/0302713 A1 | 12/2010 | Zednicek et al. | |
| 2010/0328847 A1 * | 12/2010 | Umemoto et al. | 361/525 |
| 2011/0157776 A1 | 6/2011 | Ishida et al. | |

* cited by examiner

*Primary Examiner* — George Wyszomierski
*Assistant Examiner* — Ngoclan T Mai
(74) *Attorney, Agent, or Firm* — Leydig, Voit & Mayer, Ltd.

(57) ABSTRACT

A method of making a sintered article in which a solid object is embedded includes forming a green body of compressed particles with the solid body is partially embedded. The green body includes an opening across which the solid body extends. The green body is sintered to form a sintered body and the opening permits deformation of the solid body in response to stress applied during the sintering process. A sintered article in which a solid body is at least partially embedded includes an opening. The solid body extends across the opening so that the solid body can deform within the opening. The opening in the solid body prevents distortion of the sintered body from a planar configuration during sintering, even when the green body is relatively thin.

11 Claims, 6 Drawing Sheets

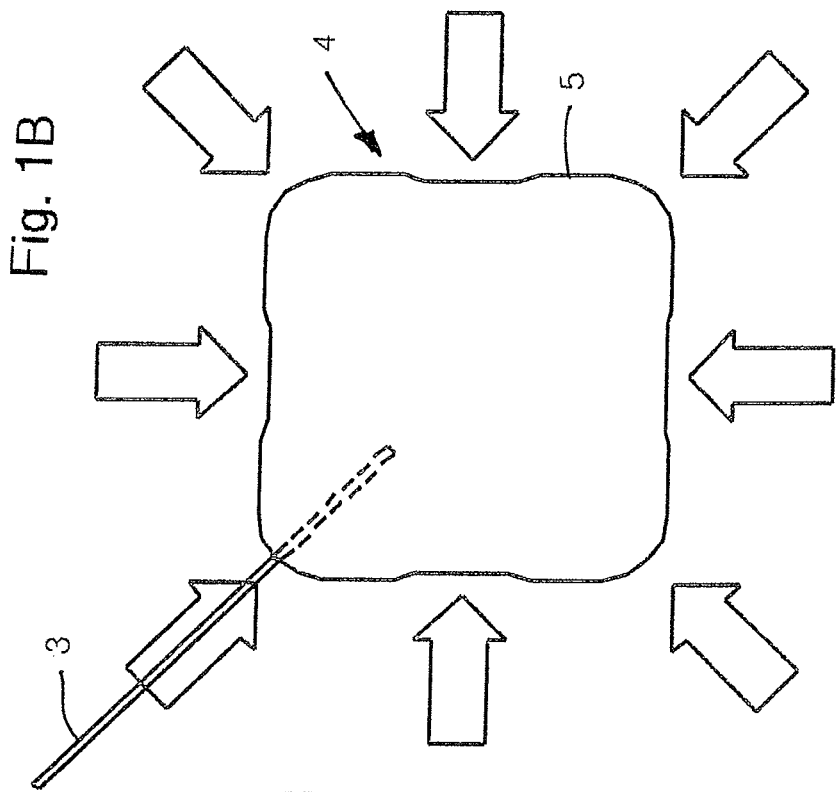
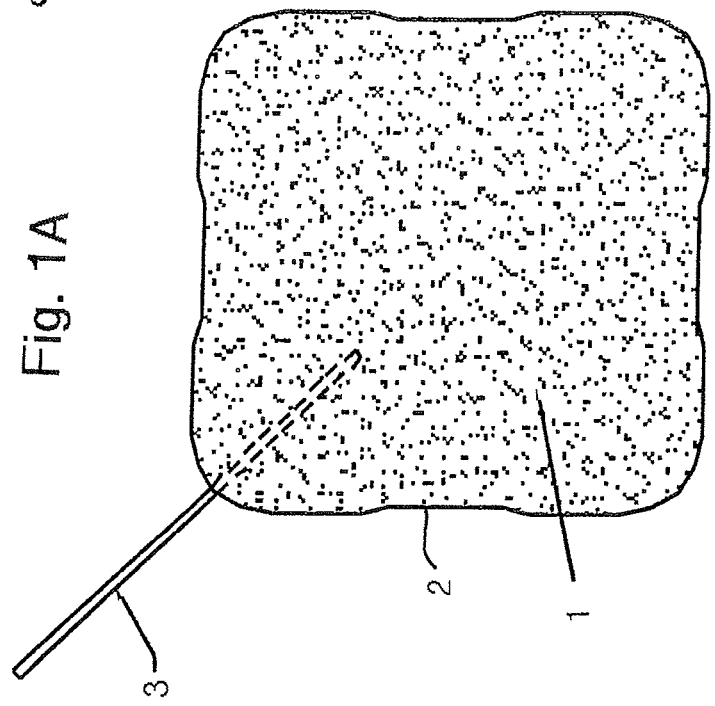

SINTERING METHOD, PARTICULARLY FOR FORMING LOW ESR CAPACITOR ANODES

BACKGROUND

The present invention concerns a sintered article, and a method of producing the sintered article. The method and article are particularly useful in making, and as, a low equivalent series resistance (ESR) capacitor anode precursor of an oxidized valve metal.

Sintering is a well-known method for making articles from particles of a material. The particles may be coarse or very finely divided, even in the foam of a powder. Typically, the material to be sintered is formed into a particular shape, for example, by compression, within a mold, using a press, or by another known method. The shaped object, prepared from the particles of the material, is referred to here as a green body. The green body is heated to a temperature below the melting point of the material, with the result that the particles of the green body adhere to each other in what is here called a sintered body. This heating step is referred to here as the sintering process.

The materials that may be employed in a sintering process include metals, ceramics, and many other materials. The green body may be subjected to compression during the sintering process, or may simply be heated, without the application of any external pressure, in the sintering process. The ambient in which the sintering occurs may be air, a controlled gas or mixture of gases, or a vacuum, depending upon the reactivity of the material and the desired structure of the sintered body. For example, in some circumstances the exposed surfaces of the particles in the sintered body should be free of oxides or other compounds that might be formed in sintering the green body in a particular ambient. A binder may be used to keep the particles of the green body together before sintering. The binder may be driven off or reacted in the sintering process or removed with a solvent or by a different process after completion of the sintering process.

In the sintering process at least one of the dimensions and shape of a green body usually changes. In most instances, the density of sintered body is higher than the density of the green body. Although the material being sintered is not fused, the material of the particles being sintered may move into the voids within the green body in the sintering process. Even assuming that none of the material of the green body is lost during the sintering process, the overall volume of the green body usually decreases, i.e., the porosity decreases, increasing the density of the sintered body, as compared to the density of the green body. Material transport phenomena, such as recrystallization, diffusion, and evaporation and condensation, may occur in the sintering process. In any event, the green body and its external dimensions usually shrink in the sintering process. The shrinkage must be taken into account when forming a green body that is expected to produce a sintered body of specific external dimensions and shape.

Still other phenomena are observed in sintering when a green body contains all or part of a solid body. As used here, the term "solid body" means a body made of a material having its nominal density as an element, a compound, a mixture, an alloy, and the like. A solid body does not appreciably shrink during sintering of particles of a material in which at least part of the solid body is embedded. If the solid body is a material having some porosity and shrinks to some degree in the sintering process, then the shrinkage of the "solid body" is negligible with respect to the shrinkage of the green body in the sintering process.

In a green body including a solid body, the particles of the green body are compressed or formed to encapsulate at least part of the solid body. The solid body may be, in some applications, a wire or a rod that projects from inside the green body to outside the green body. The wire or rod may provide a handle for handling the green body and the sintered body without the necessity of touching either body. The wire or rod may also provide an external electrical connection to the sintered body without the necessity of attaching, after sintering, a wire or rod to the sintered body. In some electrical applications, for example, in a conventional anode of a capacitor, an electrical lead may be attached to a sintered body of a valve metal, for example of tantalum, by welding. That additional step and its complications may be avoided if the wire can be embedded in the valve metal particles before their sintering. In the sintering process, the wire bonds to the sintered particles.

When a solid body is present within a green body, the solid body affects the sintering process and the configuration of the sintered body as compared to the result of sintering of a similar green body free of any solid body. The presence of the solid body changes, through at least part of the green body, the composition and porosity of the green body. The density and porosity become non-uniform in the green body and discontinuous in cross-sections of the green body that intersect the solid body. Therefore, the processes of material transport during sintering that result in changes in density, porosity, dimensions, and shape during sintering become locally variable within the green body. The exterior dimensions of the green body may change in a different way from the changes experienced when the green body is homogeneous.

The non-uniformities within a green body in which a solid body is embedded mean that the sintering particles exert a stress on the solid body in the sintering process. In general, the applied stress is a compressive stress as the green body shrinks while the solid body does not appreciably change in dimensions, density, or porosity. If the material of the particles being sintered is different from the density of the material of the solid body that is at least partially within the green body, additional stresses can be exerted due to differences in coefficients of thermal expansion of the particles and of the solid body. Of course, even when the particles of the green body and the solid body are made from the same material, the coefficients of thermal expansion of the particles and the solid body may be effectively different because of the different densities of the green body, considering the interstices that are present in the green body, but which are effectively absent from the solid body.

The changes in dimensions of a sintered body produced in sintering a green body containing a solid body, as compared to a green body that is relatively homogeneous, are particularly apparent when the sintered body is relatively thin. In this description, the thinness of a body is described with respect to an aspect ratio. Assuming a relatively thin sintered body is generally planar, the area of the sintered body can be obtained by projecting the sintered body onto a plane, in a direction along the thickness direction of the sintered body. The body can be described as having an aspect ratio, based on that area and the thickness of the sintered body. The aspect ratio is the result of dividing a dimension of the area of the sintered body, derived from the area projected, by the thickness of the sintered body. For example, the dimension may be a side of a body that has a generally rectangular area, the length of a diagonal dimension of a body with a generally rectangular area, or the diameter of a generally circular body. The thickness dimension is measured along a direction transverse to that dimension related to the area, for example, perpendicular to the plane upon which a generally, but not perfectly, planar thin sintered body is projected.

A larger aspect ratio green body indicates a thinner green body and a thinner sintered body. Thus, a higher aspect ratio sintered body made from a green body that is not mechanically restrained in the sintering process is more likely to deviate from perfect planarity, as a sintered body, than is a sintered body with a lower aspect ratio. This result follows because stresses induced in sintering more easily distort a thin body. When a solid body is present in a thin planar green body, the probability that a thin sintered body produced from the thin green body will not be planar is increased. The additional sintering stress induced by the solid body are likely not symmetrical with respect to the area of the sintered body, causing curling or bending of the thin green body during the sintering process.

An example of a relatively thin green body, incorporating a solid body, is illustrated in a plan view in FIG. 1A. The sintered body that results from sintering the green body of FIG. 1A is shown in plan view in FIG. 1B. In this example, the sintered body is a valve metal anode precursor intended for use as an anode, after subsequent processing, in a capacitor. Examples of such capacitors are electrolytic wet-slug capacitors and hybrid capacitors described in my U.S. Pat. No. 5,369,547, the contents of which are incorporated herein by reference. While the preferred anode is constructed by sintering particles of tantalum, similar anodes can be made by sintering other valve metals, including niobium, titanium, zirconium, and aluminum.

As shown in FIG. 1A, the green body 1, compressed from metallic tantalum particles, has a generally square shape with four sides 2. The green body 1 also includes a wire 3 projecting from the green body and arranged generally diagonally with respect to the "square" green body. The wire 3 projects from the green body at the intersection of two adjacent sides 2. The wire functions, as explained below, as an electrical connection in completing the anode and in an assembled capacitor. The wire also functions as a handle for post-sintering processing of the anode precursor.

FIG. 1B illustrates the changed shape of a sintered body 4 after the sintering of the green body 1. As indicated by the arrows, there is shrinkage of all sides 2 of the green body in the sintering process to the sides 5 of the sintered body 4. As shown in FIGS. 1A and 1B, the wire 3 is placed along only about one-third to one-fourth of the diagonal of the green body 1. This limited penetration of the wire is maintained to limit distortion and deformation of the green body during sintering due to the presence of that solid body, i.e., the wire 3 in this instance. If the wire were inserted farther into the green body or entirely across the diagonal of the green body, the deformation of the sintered body from a plane could become dramatic. The resulting sintered body can deviate substantially from a planar configuration, sometimes curling enough to resemble the shape of a potato chip or the surface of a saddle. It is important in assembling a capacitor with a sintered anode that the anode be planar to ensure compactness of the capacitor and proper functioning of the anode in cooperation with other components of the capacitor, for example, a cathode and ion-permeable separator.

The inability to produce a planar sintered anode precursor reliably, if the wire 3 extends further into the green and sintered bodies, has an adverse effect upon the performance of the capacitors that are produced using sintered anodes. In the precursor of FIG. 1B, contact between the wire 3 and the sintered body occurs only along the surface of the wire that is within the green and sintered bodies. The resistance of the connection, which is a significant component of the ESR of a capacitor employing an anode prepared from the sintered body 4, directly depends upon the mutually contacting surface areas of the wire and the sintered body. A higher ESR indicates shorter useful capacitor lifetime and lower useful frequency response of the capacitor.

FIGS. 2 and 3 are, respectively, schematic exploded and cross-sectional views of the structure of a capacitor employing two sintered valve metal anodes, made from green bodies, like the anode precursors shown in FIGS. 1A and 1B.

The capacitor 30 shown in FIGS. 2 and 3 can have essentially any shape, in a plan view, transverse to the view of FIG. 3, for example a circular or polygonal shape. An example of the latter shape is shown in FIG. 2. The capacitor 30 includes a case 32, preferably a conductive metal. The case 32 is sealed by and to a header 34. The header 34 is preferably welded to the case.

In the capacitor of FIGS. 2 and 3, three cathodes 36 are alternately laminated with two anodes 38. Each cathode is preferably a metal foil. The anodes 38 are sintered bodies of a valve metal, preferably tantalum, that forms a native oxide on the surfaces of the particles. The oxide thickness may be anodically increased to increase the voltage rating of the capacitor. Respective ion-conductive separators 40 are interposed between the opposing faces of paired cathodes and anodes. The lowermost cathode 36 within the case 32 is in contact with a separator 40. Each of the cathodes includes a projecting electrically conductive tab 42, with an insulator part 44. The insulating part 44 is folded against the inside surface of the case 32 and the tab 42 is electrically connected to the case so that the case forms one electrical terminal, namely the negative terminal, of the capacitor. Likewise, each of the anodes includes a projecting lead 46 that is bent toward the header 34, but electrically insulated from the case 32. The projecting leads 46 pass through a diagonal slot 48 in an electrically insulating polymeric spacer 50. The insulating spacer is further separated from the uppermost electrodes in the case 32 by a separator 40 and an insulating sheet 54 that insulates the anode leads from the adjacent cathode. Additional electrically insulating sheets 56 and 57 are interposed between the spacer 50 and the header 34. The sheets 56 and 57 include a central hole for passage of a pin 58 that functions as the second terminal, namely the positive terminal, of the capacitor. The pin 58 is held in an opening of the header 34 by a glass-to-metal seal 60. The leads 46 from anodes 38 are wound about and bonded to the lower end of the pin 58, inside the case 32. An annular gasket or spacer 6, located between the header 34 and the insulating sheet 57, cushions the assembly while the header 34 is welded to the case 32. Similarly, an insulating band 64, which may be endless or have overlapped ends, is placed in the case 32. The band 64 insulates the anodes from the case 32 and from the cathodes 36 and the cathode leads 44.

A post 68, see FIG. 3, which provides a negative terminal of the capacitor, is optionally welded to the header 34. The header 34 also includes a further opening 70, which is sealed in the completed capacitor. The opening is employed for vacuum infusion of a liquid or gel electrolyte into the case 32 of the capacitor, so that the electrolyte is in contact with the cathodes 36, the anodes 38, and the separators 40.

A structure of the capacitor 30 shown in FIG. 3 that is important in the context of the invention described below relates to the projecting leads 46 that extend from each of the anodes 38. As shown in FIG. 3, and explained above, each of those projecting leads extends from the respective anode along a length necessary to reach and be connected to the positive terminal 58 of the illustrated capacitor. These leads are relatively long and their lengths add to the ESR of the capacitor.

SUMMARY OF THE INVENTION

Accordingly, it is desirable to provide a method of making a highly planar thin sintered valve metal anode precursor incorporating, within the sintered precursor, a wire having a relatively large surface area in contact with the sintered body. More generally, it is desirable to provide a method of producing a thin substantially planar sintered body, and the thin substantially planar sintered body, containing a solid body, in the green body before, during, and after the sintering process.

According to one aspect of the invention, a sintered valve metal anode precursor for a capacitor includes a sintered body of particles of a valve metal, the sintered body having an area and a thickness that is measured transverse to the area, wherein the sintered body includes an opening extending into the thickness of the sintered body; and a solid body located at least partially within the sintered body and extending across the opening in the sintered body.

According to another aspect of the invention, a method for making a sintered valve metal anode precursor for a capacitor includes compressing particles of a valve metal together to form a green body having an area, a thickness that is measured transverse to the area, an opening extending into the thickness of the green body, and a solid body at least partially within the green body and extending across the opening in the green body; and sintering the green body so that the particles of the valve metal form a sintered body and stress applied to the solid body in the sintering is relieved by deformation of the solid body in the opening.

According to a further aspect of the invention, a sintered article comprises a sintered body of particles of a material, the sintered body having an area and a thickness that is measured transverse to the area, wherein the sintered body includes an opening extending into the thickness of the sintered body; and a solid body located at least partially within the sintered body and extending across the opening in the sintered body.

According to yet another aspect of the invention, a method for making a sintered article includes compressing particles of a material together to form a green body having an area, a thickness that is measured transverse to the area, an opening extending into the thickness of the green body, and a solid body at least partially within the green body and extending across the opening in the green body; and sintering the green body so that the particles of the material form a sintered body and stress applied to the solid body in the sintering is relieved by deformation of the solid body in the opening.

BRIEF DESCRIPTION OF DRAWING FIGURES

FIGS. 1A and 1B are, respectively, plan views of a prior art green body and a prior art sintered body of a precursor of an anode structure for use in a capacitor.

DETAILED DESCRIPTION

An important feature of the invention is the provision of a stress-relieving structure in a green body in which at least part of a solid body is present. The stress-relieving structure enables the solid body to deform or partially move during the sintering process as the green body shrinks. As a result of the stress relief, a relatively thin green body remains substantially planar in the sintering process as the sintered body is formed. As a result, the sintered body is relatively planar. Initially, the invention is described below with respect to a sintered valve metal anode precursor structure and a method of making that sintered valve metal anode precursor structure. The anode, once completely prepared, is employed in a capacitor, particularly an electrolytic capacitor, in combination with a cathode and other elements. However, the invention is not limited to capacitor anodes and has much wider application to sintered bodies and the formation of those sintered bodies, in which a solid body is included within a green body before sintering, which remains in place during the sintering process, and which remains in the sintered product.

Figure 4A:
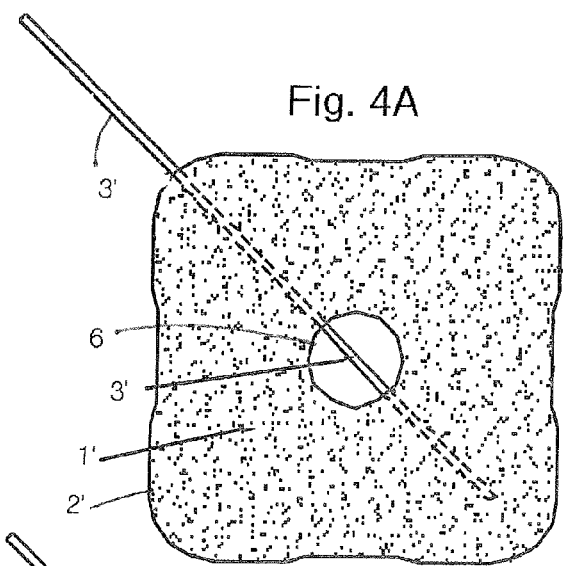
FIGS. 4A and 4B are, respectively, plan views of a green body and a sintered body, according to a first embodiment of the present invention, of a precursor of an anode for use in a capacitor.
Figure 4B:
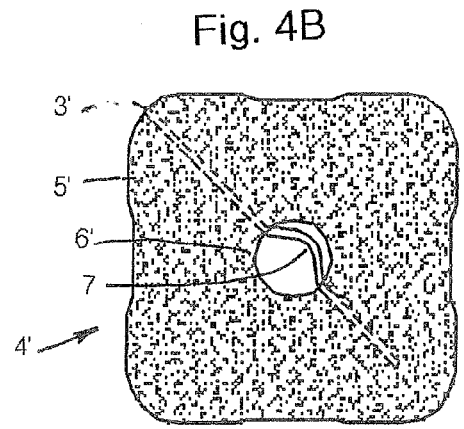

FIG. 4A illustrates, in a plan view, a green body 1' and FIG. 4B illustrates, in plan view, a sintered body 4' formed from the green body 1' of FIG. 4A. In these and all other figures the same reference numbers are employed to represent the same elements. Where elements in different figures are similar, but not identical, a prime suffix, ', is employed to indicate a difference.

The green body 1' of FIG. 4A differs from the green body 1 of FIG. 1A in several important ways. First, the solid body 3' in FIG. 4A extends much further across the green body 1' of FIG. 4A than in the green body 1 of FIG. 1A. In FIG. 4A, the wire 3' extends from one corner, i.e., edge, of the green body 1', to substantially an opposite corner, i.e., edge, of the green body 1'. Further, the green body 1' includes an opening 6 that extends entirely through the green body 1', in the direction of the thickness of the green body. The thickness direction is perpendicular to the view of FIGS. 4A and 4B. The solid body 3', in the illustrated embodiment, extends across the opening 6. That opening 6 is illustrated as being circular and centrally located within the green body 1'. While this shape and location are preferred, the opening need not be circular and can be offset from the center of the green body. However, an important advantage is achieved when the solid body 3' extends across the opening 6.

When the valve metal particles, i.e., particles of tantalum, niobium, titanium, zirconium, and/or aluminum, are subjected to sintering, the green body 1' shrinks in size, as illustrated in FIG. 4B. This shrinkage essentially corresponds to the shrinkage illustrated in the prior art sintering process illustrated in FIGS. 1A and 1B. The sides 2' of the generally square green body 1' become shorter, as indicated by the sides 5' in FIG. 4B. The shrinkage of the green body 1' places a compressive stress on the solid body 3' which, unlike the green body 1', does not appreciably shrink or change in density in the course of the sintering process. However, because of the presence of the opening 6, the solid body 1', within the opening 6, deforms in the sintering process. This deformation, shown as an arcuate portion 7 of wire 3' in FIG. 4B, relieves the compressive stress that is applied to the solid body 3'.

Because of the relief of the compressive stress exerted on the solid body 3' in the invention, a relatively thin green body is not unduly distorted in the sintering process. This maintenance of relative planarity is of substantial importance in the manufacture of planar valve metal anodes which are assembled, with other planar parts, for example, cathodes, in making a capacitor. A substantially non-planar valve metal anode may not be accommodated with the other capacitor elements within a defined volume of a capacitor case. As shown in FIG. 4B, the generally square sintered anode precursor has sides 5'. A relatively thin anode precursor having this configuration is considered to have an aspect ratio of the length of the side 5' divided by the thickness of the anode precursor. Anode precursors according to the invention can maintain sufficient planarity for use as capacitor anodes even when the aspect ratio of the green body is five and higher.

The conditions of sintering with respect to the formation of a valve metal anode precursor according to the invention are the same as those well known in the art for sintering prior art valve metal anode precursors. For example, the sintering may be carried out at a temperature in a range of approximately 1300° C. to 1650° C., under a relatively high vacuum, for example, $10^{-5}$ torr, or even higher vacuum, for a period of about 3 to 30 minutes. See, for example, U.S. Pat. Nos. 5,986,877, 6,965,510, and 7,837,743, the contents of which are incorporated herein by reference, for examples of sintering process conditions. After sintering, an oxide is anodically formed on the sintered anode precursors using known anodic oxidation techniques. Exemplary anodic oxidation techniques, typically using a phosphoric acid electrolyte, are described in U.S. Pat. Nos. 5,986,877 and 7,837,743, as well as in many other publications.

As shown in FIG. 4A, the solid body 3', which may be a wire, extends from the green body 1'. That wire may be employed for handling the green body 1' and the sintered body 4'. The wire may function as a connection in course of the electrolytic anodization process. As explained below, an electrical connection in a capacitor is made to the anode at the solid body 3' within the opening 6. The part of the wire 3' extending outside the anode precursor may be detached at the edge of the sintered body 4', particularly after the anodic formation of an oxide coating.

Figure 5A:
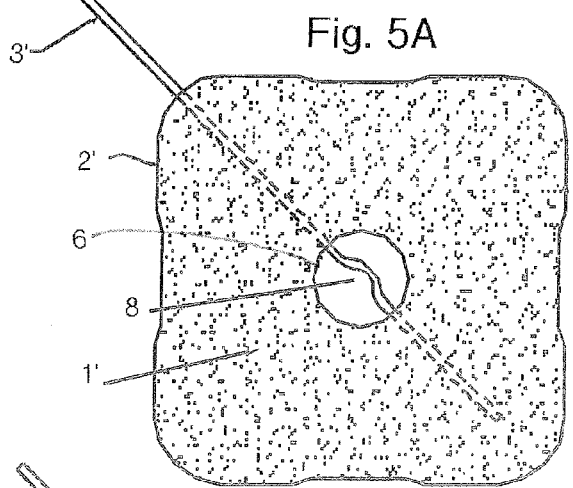
FIGS. 5A and 5B are, respectively, plan views of a green body and a sintered body, according to a second embodiment of the present invention, of a precursor of an anode for use in a capacitor.
Figure 5B:
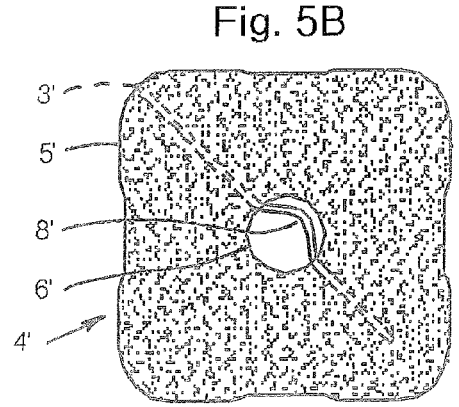
Figure 6A:
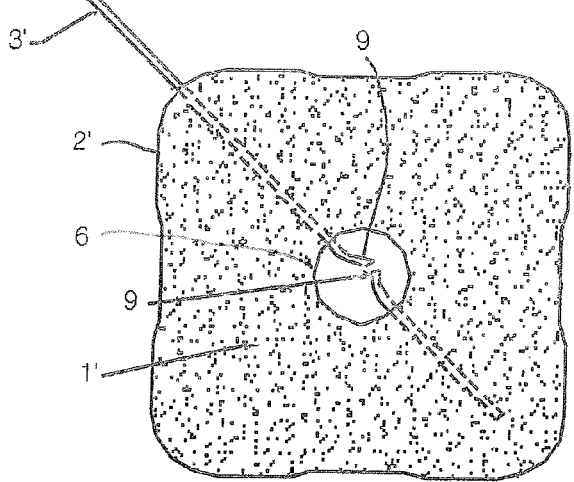
FIGS. 6A and 6B are, respectively, plan views of a green body and sintered body, according to a third embodiment of the present invention, of a precursor of an anode for use in a capacitor.
Figure 6B:
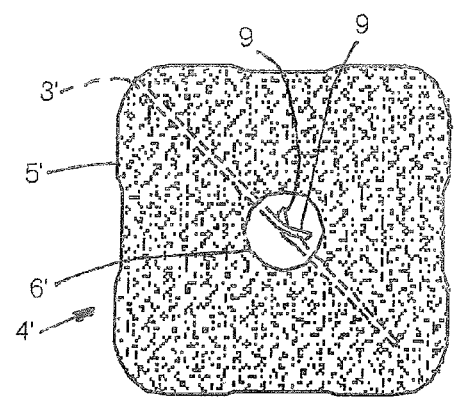

FIGS. 5A and 6A illustrate green bodies 1', and FIGS. 5B and 6B illustrate corresponding sintered bodies 4', according to further embodiments of the invention. In FIG. 5A, unlike the embodiment of FIG. 4A, a kinked or arcuately deformed region 8 is formed in the solid body 3', within the opening 6 of the green body, before sintering. Essentially, this initial deformation "primes" the solid body 3' for easier deformation during the sintering process. Thus, there is less likelihood of deformation of the green body 1' during the sintering process. In other words, the initial resistance of the solid body 3' to deformation is reduced before the sintering process begins. Further deformation of the wire 3' occurs during sintering to enlarge the arcuate part 8 in the green body 1' to the arcuate part 8' in the sintered body 4'. Otherwise, the second-described embodiment is similar to the first-described embodiment.

The third embodiment, illustrated in FIGS. 6A and 6B, like the second-described embodiment, avoids initial resistance of a straight solid body 3' in the opening 6 to deformation in the sintering process. As shown in FIG. 6A, the solid body 3' is severed within the opening 6, producing ends 9 in the opening 6. The ends 9 may be deflected or deformed from each other, to eliminate contact with each other, or aligned with each other within the opening 6. Thus, in the sintering process the ends 9 of the solid body 3 can move relative to each other without interference, accommodating the shrinkage of the green body 1' in the production of the sintered body. FIG. 6B shows one example of the final positions of the ends 9 after moving due to the sintering process and the compressive forces applied to the solid body 3' during sintering.

Figure 2:
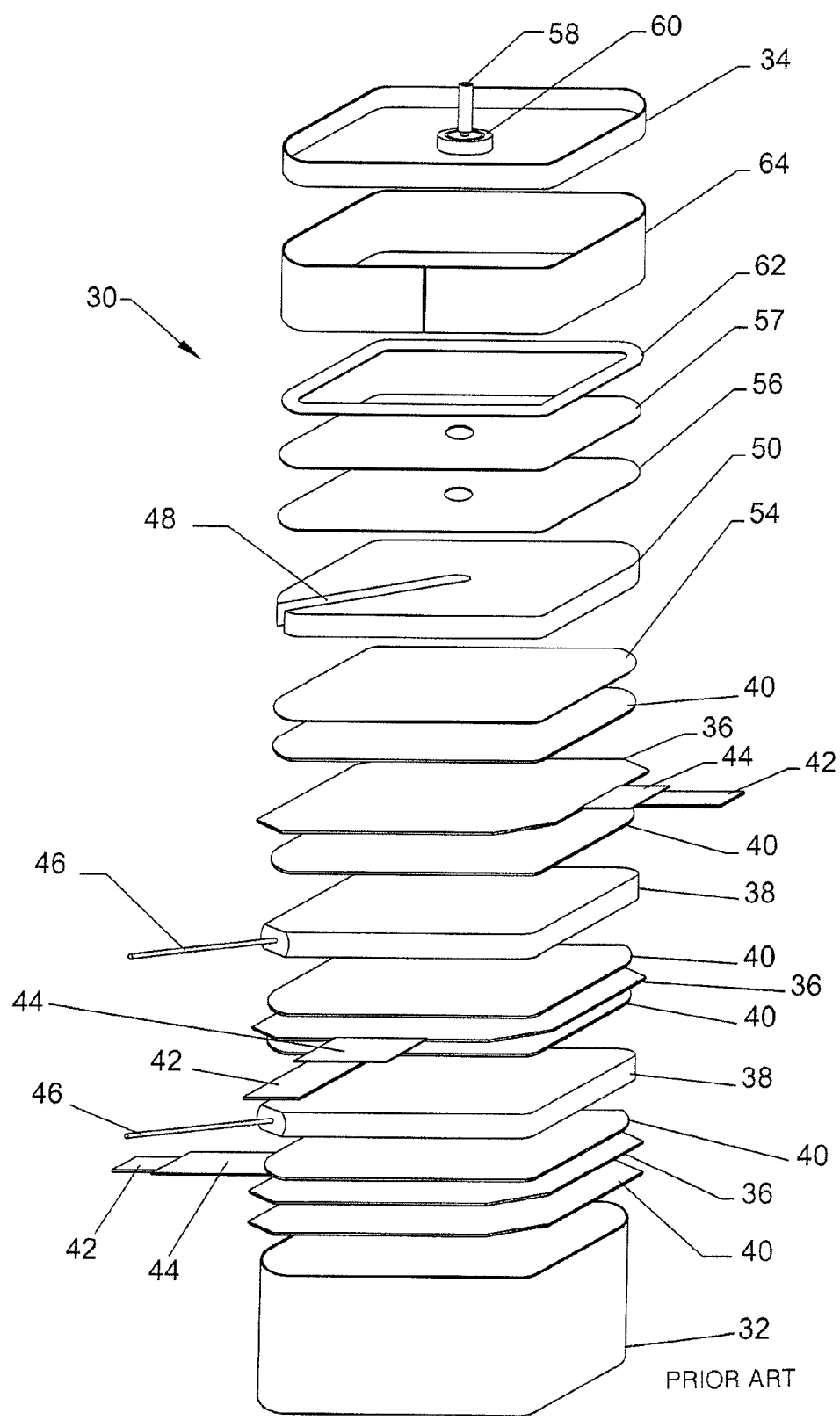
FIG. 2 is a schematic, exploded view of a prior art capacitor employing anodes made from the precursor illustrated in FIG. 1B.
Figure 3:
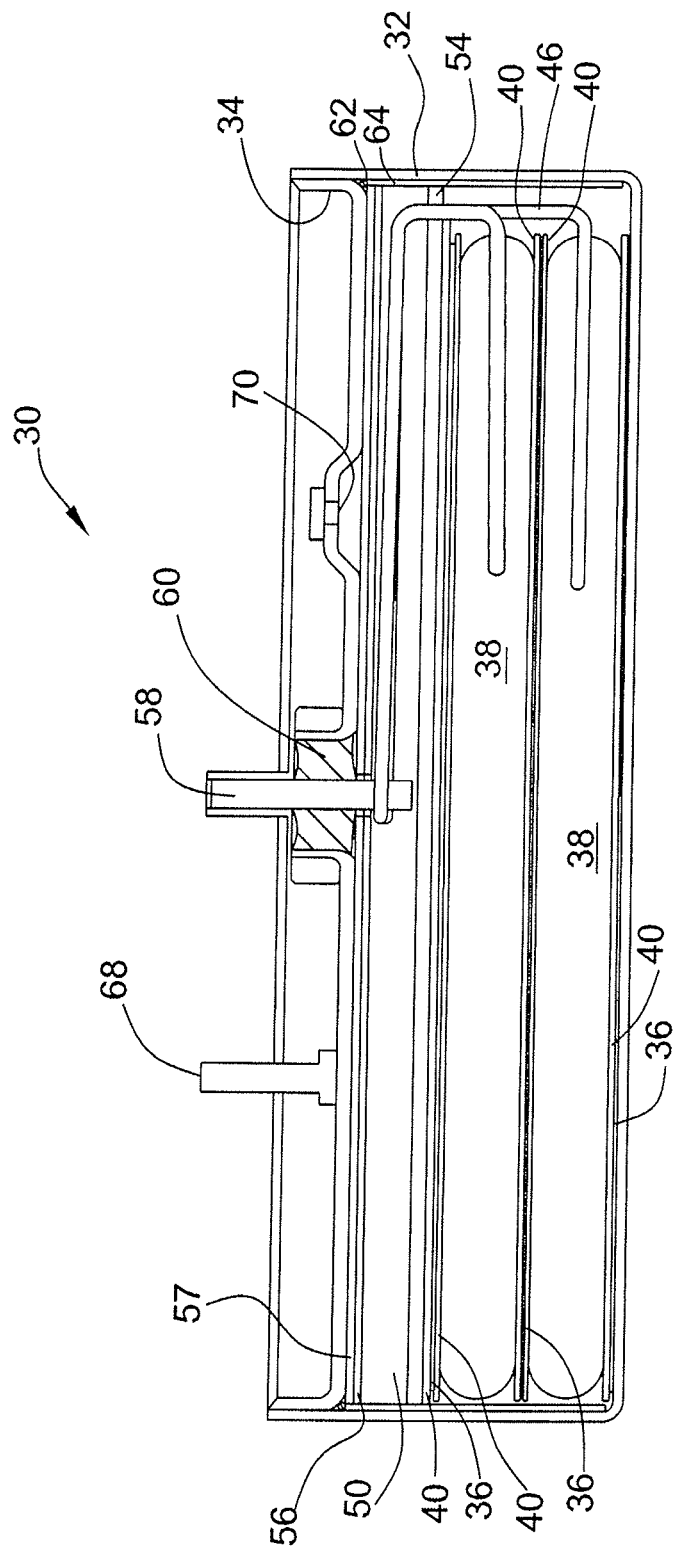
FIG. 3 is a schematic, cross-sectional view of the prior art capacitor of FIG. 2.
Figure 7:
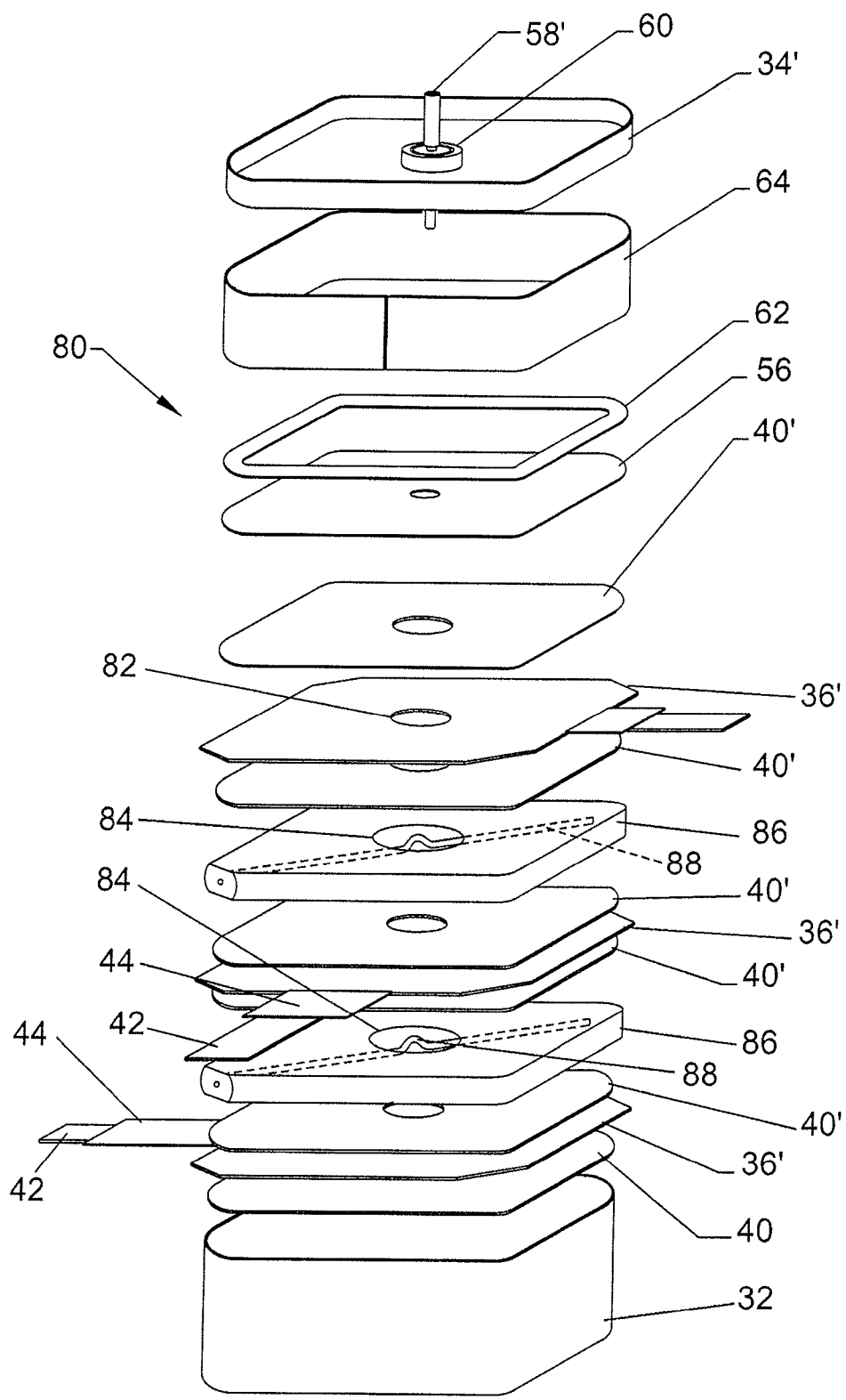
FIG. 7 is a schematic, exploded view of a capacitor employing anodes according to an embodiment of the invention.
Figure 8:
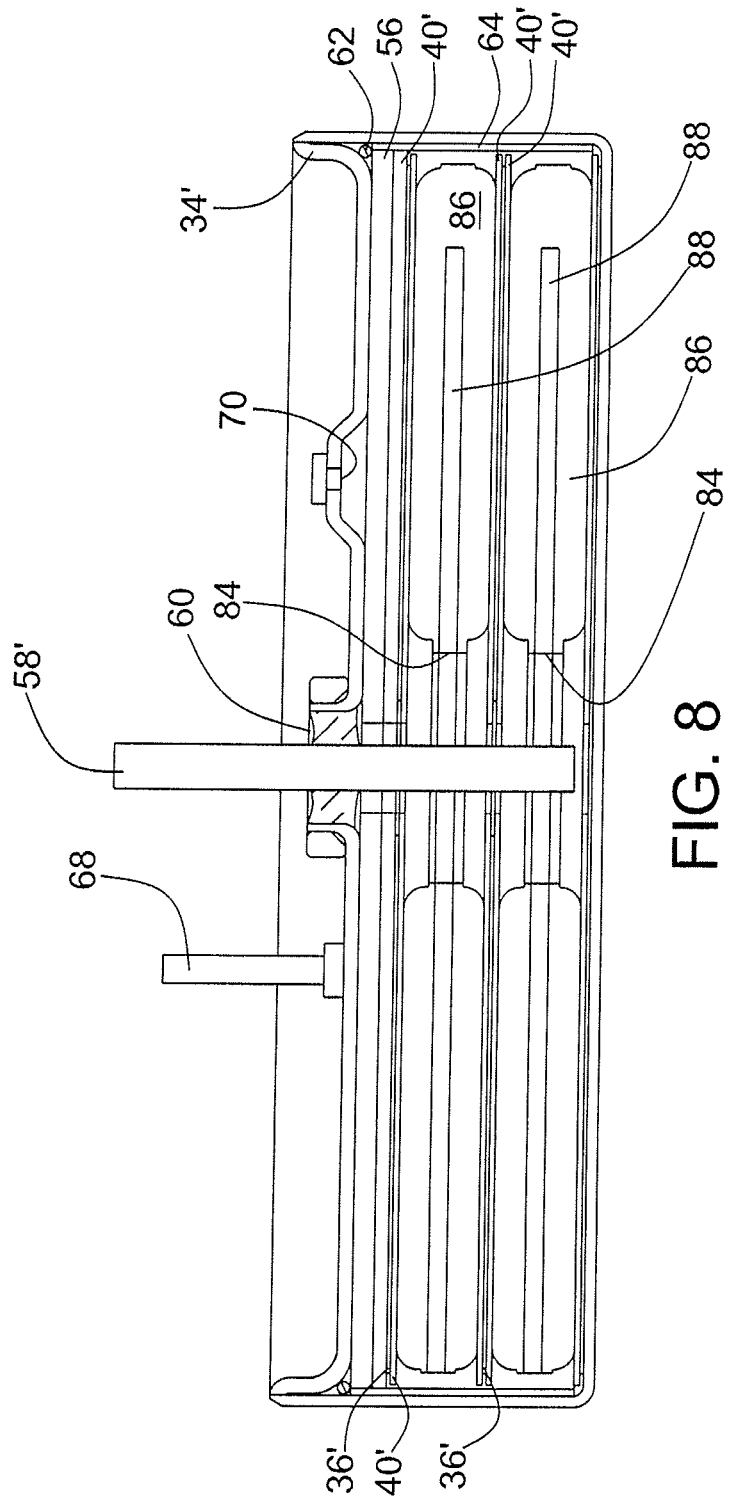
FIG. 8 is a schematic, cross-sectional view of the capacitor of FIG. 7.

A completed capacitor 80 employing two sintered valve metal anodes made according to the foregoing description and having the configuration according to the foregoing description, is illustrated in FIG. 7, an exploded view, and FIG. 8, a cross-sectional view. The elements of the capacitor shown in those figures that are the same as the elements of the capacitor structure shown in FIGS. 2 and 3 are given the same reference numbers. The addition of a prime symbol indicates an element that is nearly the same as an element in the capacitor of FIGS. 2 and 3, but with some change, for example, a centrally located hole. For example, in the capacitor 80 of FIGS. 7 and 8, the cathodes 36' are the same as the cathodes 36 of FIGS. 2 and 3, with the exception that each of the cathodes 36' includes a central, penetrating opening 82. That opening 82 is aligned with openings 84 passing through the anodes 86. Each of those anodes 86 includes a wire 88, visible in FIGS. 7 and 8. The wires 88 extend across the holes 84 of the respective anodes 86. Likewise, the separators 40' of FIGS. 7 and 8 are the same as the separators 40 of FIGS. 2 and 3, with the exception of centrally located holes. The central holes passing through the anodes 86, the cathodes 36', and the separators 40' are aligned.

The other differences between the two capacitor embodiments are the extension, within the capacitor case 32' of the pin 58' in the capacitor 80. That pin 58' provides the external anode connection of the capacitor 80. The pin 58' has a much longer extension inside the capacitor case 32 in the capacitor 80 than in the capacitor 30 of FIG. 2. The pin 58' reaches and makes electrical contact with each of the wires 88 of each of the anodes 86 within the capacitor 80.

In the capacitor structure 80 illustrated in FIGS. 7 and 8, there are no leads extending outside the anodes 86. Rather, the part of the wires 88 that initially extended from each anode have been removed by severing. Typically, the wire 88 is made of the same valve metal as the anode 86 so that the wire develops an oxide that protects the wire from the electrolyte, typically sulfuric acid, employed in the capacitor 80 when the capacitor employs tantalum anodes.

The capacitor 80 according to FIGS. 7 and 8 is assembled by inverting the header 34 from the position shown in FIG. 8 and sequentially applying the insulators, separators, cathodes, and anodes in the order shown, from the header 34 to the bottommost separator 40, which may be free of a central opening. As each anode 86 is placed in the stack, the wire 88 of that anode is welded, for example, by resistance welding, to the part of the pin 58' that extends from the header 34. This electrical connection technique is simple and reliable. Thus, unlike the capacitor embodiment 30 shown in FIGS. 2 and 3, there is no necessity of bending anode leads into a particular shape and welding those leads to the pin 58. As a result, the wires 88 effectively shorten the anode lead 46 of the capacitor embodiment 30 of FIGS. 2 and 3 by a length at least equal to one-half the side dimension of the "square" anodes 38. The shortened length of the anode connection in the capacitor embodiment of FIGS. 7 and 8 substantially reduces electrical resistance between each anode 86 and the pin 58' as compared to the electrical resistance between the anode 38 and the pin 58 in the capacitor embodiment of FIGS. 2 and 3.

Moreover, the length of the wire 88 within the sintered valve metal anode is substantially longer in a sintered valve metal anode according to the invention than in the capacitor structure of FIGS. 2 and 3. This additional length is schematically indicated in FIG. 8 as compared to FIG. 3. The increased contact area between the sintered valve metal anode 86 and the wire 88 further reduces the resistance of the electrical connection between the anode terminal 58' and the anodes. The shortened lead length outside the anode and the increased contact area of the wires 88 and the anodes 86, inside the anodes, individually and collectively decrease resistance of the capacitor. As a result, there is a substantial reduction in the ESR of the capacitor embodiment 80 of FIGS. 7 and 8 as compared to the capacitor structure of FIGS. 2 and 3.

In order to demonstrate the reduction in ESR achieved according to the invention, ten capacitors having the structure shown in FIGS. 2 and 3 were constructed and twenty capacitors having the structures shown in FIGS. 7 and 8 were constructed. The capacitors of both groups had the same external dimensions. These structures were essentially equivalent, incorporating sintered valve metal anodes, of tantalum. However, the capacitors incorporating anodes according to the invention had a slightly lower nominal capacitance than the capacitors according to the embodiment of FIGS. 2 and 3. The reduction in capacitance is attributable to the opening in each of the anodes and cathodes, reducing anode volume and cathode area. The capacitance of capacitors according to the embodiment of FIGS. 7 and 8 can be increased by thickening the anodes, a step that would also further reduce the ESR of those capacitors.

The ten capacitors according to the prior art structure had an average capacitance of 9844 µF, with capacitances ranging between 9750 µF and 9917 µF. The average ESR of those ten capacitors was nominally 37 milliohms and the ESRs ranged from 36.5 milliohms to 38.5 milliohms. The twenty capacitors incorporating anodes according to the invention had an average capacitance of 8694 µF, with capacitances ranging from 8519 µF to 8831 µF. The average ESR of those capacitors was 14 milliohms, with individual ESR values ranging from 13.5 milliohms to 14.7 milliohms.

Thus, the capacitors having the structure according to FIGS. 7 and 8 had an average ESR 60% lower than the average ESR of the comparable capacitors illustrated in FIGS. 2 and 3. The reduction in ESR is of great significance, because of the magnitude of the reduction, promising higher current handling capability, lower operating temperature, significantly extended capacitor life, and improved frequency response.

Although the foregoing description is focused on a specific application of the method according to the invention and the product in accordance with the invention, the invention is more generally applicable. The invention applies to forming sintered bodies from green bodies of particulate material that shrink upon sintering and that include, within the green bodies, a solid body. The improvement achieved, particularly when the sintered body is a relatively thin body with a high aspect ratio, may not relate to or achieve any improvement in electrical characteristics. The advantages achieved may be solely mechanical, for example, by maintaining relative planarity of the sintered body after sintering a green body having a high aspect ratio. That result is achieved by providing within the green body an opening in which a part of the solid body is exposed so that the solid body can deform in the sintering process, relieving compressive stress applied to the solid body in the sintering process. While it is preferred that the opening extend entirely through the green and sintered bodies, it is sufficient that the opening provide a region of the solid body that exposes and is not in contact with the green body and leave sufficient space for deformation of the solid body during the sintering process. While preferred, the opening need not be centrally located in the green body and the solid object need not extend throughout all of the green body to achieve the advantages of the invention. The principal advantage of the invention is the production of a sintered body having a predictable size and shape, notwithstanding the embedding within at least part of the green body of a solid body that is not susceptible to shrinkage, in relation to the quantity of shrinkage of the green body, in the sintering process.

The invention claimed is:

1. A method of making a sintered valve metal anode precursor for a capacitor, the method comprising:
   compressing particles of a valve metal together to form a green body having an area, a thickness that is measured transverse to the area, an opening extending into the thickness of the green body, and a solid body at least partially within the green body and extending across the opening in the green body; and
   sintering the green body so that the particles of the valve metal form a sintered body and stress applied to the solid body in the sintering is relieved by deformation of the solid body in the opening.

2. The method of making a sintered valve metal anode precursor according to claim 1 including, before sintering the green body, forming an arcuate portion of the solid body within the opening.

3. The method of making a sintered valve metal anode precursor according to claim 1 including, before sintering the green body, severing the solid body within the opening.

4. The method of making a sintered valve metal anode precursor according to claim 1, wherein the area includes at least one linear dimension, the linear dimension divided by the thickness of the sintered body is at least 5, and the sintered body is substantially planar.

5. The method of making a sintered valve metal anode precursor according to claim 1, wherein the solid body extends from substantially a first edge of the green body, through the opening, and substantially to a second edge of the green body.

6. The method of making a sintered valve metal anode precursor according to claim 1 including, after forming the sintered body, anodically oxidizing the valve metal particles of the sintered body.

7. The method of making a sintered valve metal anode precursor according to claim 1 including forming the opening to pass entirely through the green body.

8. A method of making a sintered article comprising:
   compressing particles of a material together to form a green body having an area, a thickness that is measured transverse to the area, an opening extending into the thickness of the green body, and a solid body at least partially within the green body and extending across the opening in the green body; and
   sintering the green body so that the particles of the material form a sintered body and stress applied to the solid body in the sintering is relieved by deformation of the solid body in the opening.

9. The method of making a sintered article according to claim 8 including, before sintering the green body, forming an arcuate portion of the solid body within the opening.

10. The method of making a sintered article according to claim 8 including, before sintering the green body, severing the solid body within the opening.

11. The method of making a sintered article according to claim 8, wherein the solid body extends from substantially a first edge of the green body through the opening, and substantially to a second edge of the green body.

* * * * *